United States Patent [19]

Badger

[11] Patent Number: 4,600,204
[45] Date of Patent: Jul. 15, 1986

[54] CORNER BUMPER FOR SHOPPING CART

[75] Inventor: Ronald L. Badger, Battle Creek, Mich.

[73] Assignee: United Steel & Wire Company, Battle Creek, Mich.

[21] Appl. No.: 702,517

[22] Filed: Feb. 19, 1985

Related U.S. Application Data

[63] Continuation-in-part of Ser. No. 613,858, May 24, 1984, abandoned.

[51] Int. Cl.⁴ .............................................. B62B 3/00
[52] U.S. Cl. ........................... 280/33.99 A; 293/117; 293/123
[58] Field of Search ............... 280/762, 770, 33.99 A, 280/33.99 B, 33.99 C, 33.99 F; 293/1, 38, 117, 123; 15/325

[56] References Cited

U.S. PATENT DOCUMENTS

| | | | |
|---|---|---|---|
| 2,791,049 | 5/1957 | Berger | 280/33.99 A |
| 2,935,330 | 5/1960 | Millman | 280/33.99 A |
| 3,195,912 | 7/1965 | Howard | 280/33.99 A |
| 3,503,622 | 3/1970 | Romero | 280/33.99 F |
| 3,702,018 | 11/1972 | Wood | 280/33.99 A |

OTHER PUBLICATIONS

United Model 2788 Shopping Cart brochure.
United Drawing #1-1295-515 dated 6-8-76 entitled "Basket Bumper Set".

*Primary Examiner*—John J. Love
*Assistant Examiner*—Joseph G. McCarthy
*Attorney, Agent, or Firm*—Flynn, Thiel, Boutell & Tanis

[57] ABSTRACT

A shopping cart having an upwardly opening basket supported on a wheeled base. The basket includes a front wall rigidly joined between a pair of side walls through intermediate front corners. The front and side walls are defined by intersecting wire rods which extend vertically and horizontally to form a gridlike construction. The horizontal wires are normally positioned outermost relative to the vertical wires and are substantially vertically spaced apart. An elongated striplike plastic bumper is positioned to extend longitudinally along and conform with each of the vertical front corners of the basket. The bumper is of a substantially L-shaped cross section and has an inner surface which enables it to conform to and abut against several of the vertically spaced horizontal wires. Upper and lower hooks associated with the bumper project inwardly and downwardly to engage a pair of vertically spaced horizontal wires.

15 Claims, 8 Drawing Figures

CORNER BUMPER FOR SHOPPING CART

CROSS REFERENCE TO RELATED APPLICATION

This application is a continuation-in-part of my copending application Ser. No. 613,858, filed May 24, 1984, now abandoned.

FIELD OF THE INVENTION

This invention relates to a shopping cart of the type having a goods-receiving basket formed from a plurality of horizontally and vertically extending wires which intersect and are suitably rigidly joined together and, in particular, to an improved protective bumper which can be readily mounted on the front corners of the basket.

BACKGROUND OF THE INVENTION

The use of wheeled shopping carts within supermarkets and the like has long presented the problem of damage to store fixtures such as refrigerator and freezer cases. Such shopping carts are conventionally pushed against or slid along the faces of the store fixtures and, since the baskets are constructed from wire rod, this causes substantial damage to the store fixtures and makes them unsightly. To minimize such damage, many store fixtures have been provided with a rub strip extending longitudinally along the front face thereof, which strip was intended to engage the cart basket and maintain it spaced from the front face of the fixture. While such rub strips are themselves less than desirable and detract from the appearance of the store fixtures, nevertheless they have tended to minimize damage to the fixtures, particularly when the supermarket utilizes conventional shopping carts of the type having baskets which nest one within the other. Such baskets are normally provided with a rather low bottom wall and permit the rub strip to engage the front corners of the basket. Such rub strips, however, have not always solved the problem of damage to store fixtures, and such strips themselves can be damaging to carts due to the rubbing on the wires of the basket.

To improve upon this problem, most cart-manufacturers offer an optional bumper which can be mounted on the front corner of the basket. This bumper comprises a small L-shaped plastic element which is positioned to horizontally wrap around the front corner of the cart, with the bumper having a horizontally elongated groove on the inner side thereof to effectively snap over one of the horizontal wires of the basket. Such bumpers have traditionally been of only small vertical extent, such as less than two inches, and in addition can be provided only where the basket has horizontally extending wires. Such bumpers have been of only minimal effectiveness in view of their size and positional limitations. For this reason, some users request that the carts be equipped with several such bumpers disposed vertically spaced along the front corners of the cart in an attempt to improve upon the protection afforded the store fixtures. This, however, results in the cart being rather unsightly. In addition, these small bumpers can often be readily removed or accidentally dislodged from the cart, and hence use of these small bumpers has been limited.

In an attempt to improve upon this problem, many years ago the assignee of this application developed and attempted to commercialize a vertically elongated bumper which would extend along the majority of the front corner of the basket. This prior bumper involved an elongated plastic bumper strip which had several horizontal slots formed in the inner surface thereof in vertically spaced relationship. These vertical-spaced slots were positioned to correspond to the positioning of the horizontal wires on the basket so that the bumper could be positioned over these wires adjacent the external front corner of the basket. The bumper strip also had integral protrusions which projected through the wall of the basket into the interior thereof, which protrusions defined a vertically elongated slot extending along the inner corner of the basket. An elongated plastic locking pin was then inserted downwardly in the interior of the basket through the slot defined by the protrusions to hence lock the bumper to the basket. In this arrangement, however, it was found that the pin could not be snugly fitted in the slot since the pin tended to work loose, and in addition the carts could be vandalized in that the pins could be removed so that the bumpers would hence become lost. Thus, it was necessary for the plastic pins to be fixed to the bumper strip, as by means of a solvent which effected a welding of the plastic pieces together. However, users of shopping carts did not commercially accept this bumper for several reasons. First, a different style of bumper had to be designed for each style cart inasmuch as the bumper required an interfitting relationship with the horizontal wires on the basket, and hence prevented the bumper from being universally fitted on most commercially available carts. Secondly, the necessity of having to use a solvent to secure the locking pin to the bumper was also undesirable since most bumpers are retrofitted on the carts in the field, and end users do not wish to undertake any project which involves the use of solvents and the like in order to permit such a retrofitting operation to be accomplished. For this reason, this prior type bumper was not accepted, and hence its commercialization and use was discontinued many years ago.

Nevertheless, the problem of damage to store fixtures as caused by the cart baskets has continued to be an ongoing and long-standing problem. The extent of this problem is evidenced by the fact that, in recent years, many supermarkets have utilized carts of the type referred to as "over-the-counter" carts. These latter carts have a much higher basket since the bottom of the basket is designed to be positioned over the checkout counter. These baskets, due to their height, have also created a substantial problem with respect to damaging store fixtures, and it has hence been conventional in the shopping cart industry to provide such carts with a plastic bumper at the lower front corners.

Of late, however, supermarkets are demanding carts having increased goods-carrying capacity in the basket, and thus many supermarkets are now switching from over-the-counter carts back to conventional carts of the type having baskets which nest one within the other, except that such carts are being provided with significantly larger baskets to provide substantially increased capacity. Further, these conventional carts are being provided with baskets of increased length to increase the capacity thereof, and hence the problem of damage to store fixtures is again a significant one since it has been observed that these carts often do not contact the rub strips on the fixtures due to such strips being improperly elevationally positioned. Further, when the front corners of the basket do contact the rub strips, these strips themselves have been observed to damage the basket. For example, where two side-by-side cabinets are joined together, the rub strips of the two cabinets normally have a small joining plate positioned at the joint or seam, which joining plate projects slightly forward from the rub strips inasmuch as it overlaps the adjacent ends thereof. When a cart is slidably moved along the rub strip, the vertical wires of the cart adjacent the front corner often engage this joining plate, which hence causes the front vertical wire to be severely stressed and effects a braking of the weld from the supporting horizontal wires.

Accordingly, it is an object of this invention to provide an improved bumper arrangement for a shopping cart basket which provides improved protection for both the basket and store fixtures, which bumper arrangement is believed to overcome or significantly minimize the problems associated with prior structures of this type, as explained above.

More specifically, it is an object of this invention to provide an improved bumper arrangement which can be mounted on the front corners of the cart basket to extend along a substantial majority of the vertical extent of each corner to optimize protection for both the basket and the store fixtures, which can be readily and universally mounted on substantially any conventional cart basket irrespective of the arrangement or positioning of the horizontal wires making up the cart basket, which can also be readily retrofitted in the field to most existing carts in a very simple manner requiring only minimal time and effort and without requiring any sophisticated tools or the like, which can be manufactured efficiently and economically, and which provides the cart with a desirable appearance when mounted on the cart basket.

In the improved cart and bumper arrangement of this invention, there is provided a vertically elongated plastic bumper strip which has a substantially L-shaped cross section so that the bumper will fit in a wrapped-around relationship along the front corner of the cart basket. The bumper strip has a length which enables it to extend over a substantial majority of the length of the front corner. The bumper strip has a pair of sidewardly and downwardly directed L-shaped securing hooks provided at the upper and lower ends thereof, which hooks project transversely inwardly a substantial extent beyond the inner surface of the bumper strip. The bumper strip is positioned to abut against several of the horizontally extending wires of the cart basket directly at the front corner thereof. The securing hooks project inwardly through the wall of the basket by an extent sufficient to overlap the horizontal wires. The bumper arrangement can, after positioning of the bumper against the front corner, be slidably moved downwardly so that the upper and lower hooks overlap and project downwardly past a pair of horizontal basket wires, following which the lower free end of the upper hook is suitably deformed into a position beneath the horizontal wires to fixedly secure the securing rod, and hence the bumper strip, to the cart basket.

With the improved bumper arrangement as described above, the bumper strip has a smooth internal surface which extends vertically thereof and abuts the horizontal wires of the basket, and the same bumper strip can thus be utilized on baskets having significantly different configurations without requiring the manufacturing and stocking of several different sizes of bumper arrangements. Further, once the bumper arrangement is mounted on the basket, it is securely retained and is not readily subject to vandalism. The resulting bumper strip provides protection along a majority of the vertical extent of the front corners of the basket, and hence provides effective protection for both the store fixtures and the basket.

Other objects and purposes of the invention will be apparent to persons familiar with shopping carts of this general type upon reading the following specification and inspecting the accompanying drawings.

Certain terminology will be used in the following description for convenience in reference only and will not be limiting. For example, the words "upwardly", "downwardly", "rightwardly" and "leftwardly" will refer to directions in the drawings to which reference is made. The words "forward" and "rearward" will refer to opposite ends of the cart as respectively appearing on the right and left sides of FIG. 1. The words "inwardly" and "outwardly" will refer to directions toward and away from, respectively, the geometric center of the cart and designated parts thereof. Said terminology will include the words specifically mentioned, derivatives thereof, and words of similar import.

DETAILED DESCRIPTION

Figure 1:
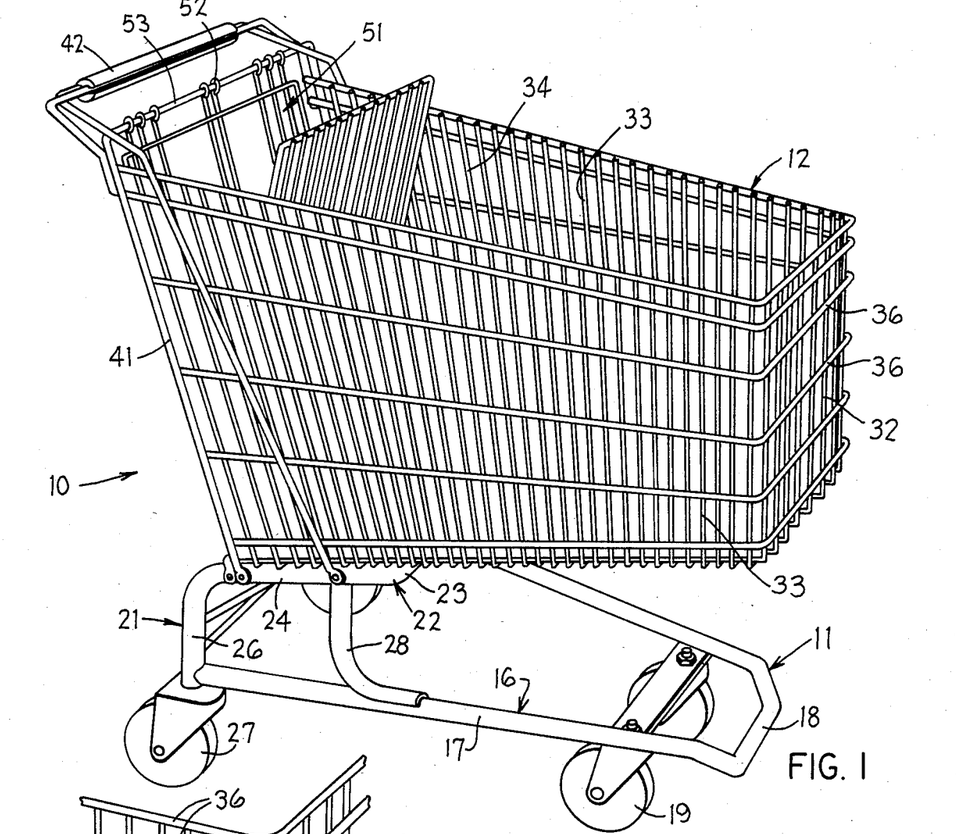
FIG. 1 is a perspective view of a conventional shopping cart of the type having a basket which nests within a basket of a similar such cart.

FIG. 1 illustrates therein a shopping cart 10 which includes a wheeled base 11 supporting an upwardly opening basket 12 thereon.

The base 11 includes a U-shaped bottom frame rail 16 which defines a pair of converging side rails 17 having an integral front rail or bight portion 18 at the forward and thereof. A pair of conventional casters 19 are supported under the front end of the base rail. The rearward ends of the side rails 17 are fixedly joined, as by welding, to a further U-shaped frame member 21 which includes a U-shaped basket portion 22 which is spaced upwardly from the base rail 16 in approximately parallel relationship therewith. This basket-supporting portion includes a front leg or cross rail 23 which extends across beneath the basket and terminates in side rails 24 which project rearwardly toward the rear of the basket and then bend downwardly to define rear legs 26 which, at their lower ends, have rollers 27 mounted thereon. Suitable reinforcing braces 28 extend between and are fixedly connected to the vertically spaced rails 17 and 24.

The base 11 is of a generally tapered or converging configuration as it projects forwardly from the rear end thereof to permit the base of one cart to partially nest within the base of the next forwardmost cart to facilitate storage of like carts.

The construction of the base 11, as briefly described above, is conventional so that further detailed description thereof is believed unnecessary.

The basket 12, in the illustrated and preferred embodiment, is constructed of wire rod. The basket includes a bottom wall 31, an upright front wall 32, and a pair of opposed side walls 33, which walls are all integrally and rigidly joined together. These walls are all formed from a plurality of intersecting metal wires or rods, such as the vertical rods 34, which are suitably welded together at their intersection points to define a gridlike structure. The front and side walls include a plurality of substantially horizontal rod elements 36 which are U-shaped and extend across the front wall and longitudinally rearwardly of the side walls, at least one of these rods 36 defining the upper edge of the basket. The bottom wall 31, which is supported on the basket support 22, is slightly upwardly sloped as it projects forwardly. The opposed side walls 33 also have a slight converging relationship therebetween as they project forwardly. These relationships permit the baskets of like carts to nest one within the other during storage.

The rear vertical edges of the side walls 33 are defined by upright rods or posts 41 which have their lower ends fixedly secured to the base, as to the side legs 24 of the basket support. The upper ends of these posts 41 project upwardly above the upper edge of the basket side walls, and a horizontally extending rodlike handle 42 is fixed to and extends between the upper ends of these posts 41.

The rear of basket 12 is closed by means of an end or rear gate 51, this gate also being formed from a plurality of intersecting wire rods which form a grid-like structure. The gate 51 includes hook portions 52 at the upper edge thereof, which hook portions hingedly support the gate on the top cross rod 53. This enables the gate to vertically swing inwardly of the basket in a conventional manner to permit nesting of like carts.

According to the present invention, as illustrated by FIGS. 2-5, there is provided an improved bumper arrangement 61. A pair of identical such bumper arrangements are adapted to be mounted on the front corners of the basket 12.

Figure 2:
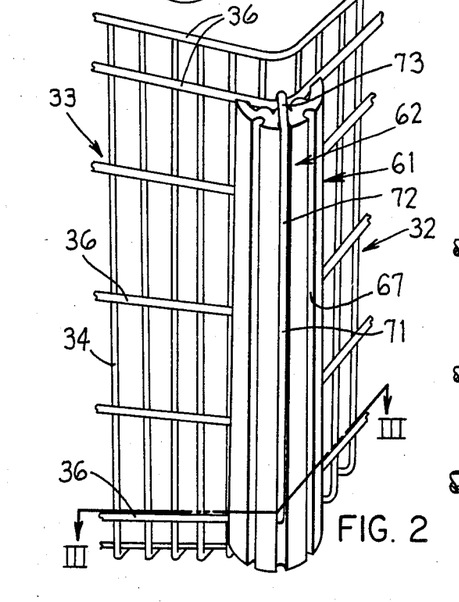
FIG. 2 is a fragmentary perspective view illustrating the front corner of the cart basket with a bumper arrangement according to this invention mounted thereon.
Figure 3:
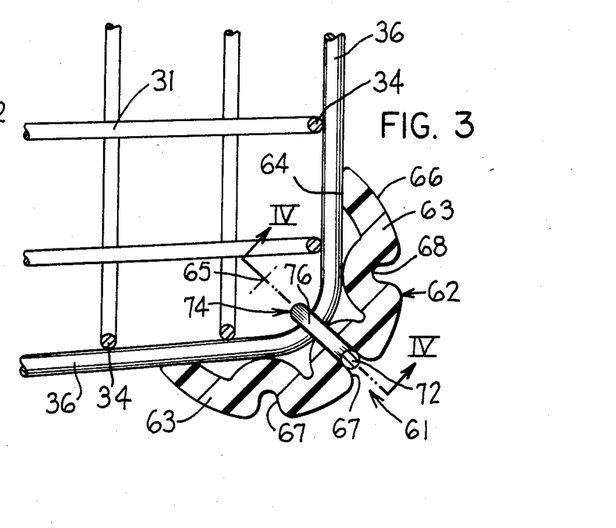
FIG. 3 is a sectional view taken substantially along line III—III in FIG. 2.

This bumper arrangement 61 includes a vertically elongated striplike bumper 62 which is preferably formed of a plastics material, such as by being extruded. This bumper 62 is substantially L-shaped in horizontal cross section and includes a pair of short and substantially identical leg portions 63 which project outwardly in approximately perpendicular relationship from a common integral corner. This bumper 62 has a rounded concave inner surface for abuttingly contacting the horizontal wires 36, which inner surface includes a smooth and substantially uninterrupted inner surface 64 extending vertically along each of the leg portions 63 adjacent the free ends thereof. The bumper 62 also has an outer surface 66 which is rounded, being generated about the center point 65 so as to be of a partial circular profile. The bumper 62 extends through an angular extent of about 180° as generated about the center point 65, and hence is generally of a semi-annular configuration.

The bumper 62 also has at least one, and three in the illustrated embodiment, elongated grooves 67 formed therein and extending longitudinally throughout the length thereof. These grooves open outwardly through the outer surface 66, and each is preferably provided with a rounded bottom wall 68. One of the grooves is formed substantially at the center of the bumper, that is, directly along the corner. The other two grooves are disposed in parallel relationship on opposite sides of the center groove (i.e., disposed 90° apart) so that one of the other grooves is hence associated with each of the leg portions 63.

To attach the bumper 62 to the basket, the bumper arrangement 61 includes at least one securing rod 71. This securing rod 71 includes a main or central rod part 72 which is straight and vertically elongated so as to have a length which is of similar magnitude, but slightly less than, the length of the bumper 62. This main rod part 72 is preferably of circular cross section and of a diameter to snugly fit within the groove 67 and substantially seat against the rounded bottom 68 thereof.

The securing rod 71 also includes upper and lower substantially L-shaped hooks 73 and 74 fixedly secured, here integrally, to the upper and lower ends of the main rod part 72. Each of these hook parts 73 and 74 includes a bridging portion 76 which is fixed to and projects transversely from the end of the main rod part 72 in substantially perpendicular relationship therewith, with the other end of this bridging portion 76 terminating in a downwardly directed rodlike locking portion 77, the latter being of substantial length and extending substantially parallel with the main rod part 72. The upper hook 73 results in the upper end of the securing rod 71 having a substantially downwardly opening U-shaped configuration, whereas the lower hook 74 results in the lower end of the rod having a substantially sidewardly oriented Z-shaped configuration. This securing rod 71 is preferably formed from a single elongated piece of steel rod, being suitably bent to form the upper and lower hooks.

The bridging portion 76 associated with the lower hook 74 extends through a small hole 79 which extends transversely through the bumper member 62 for communication with the bottom of the groove 67. This hole 79 is positioned closely adjacent the lower end of the bumper 62, and an identical such hole extends through the bumper for communication with each of the grooves 67.

Figure 4:
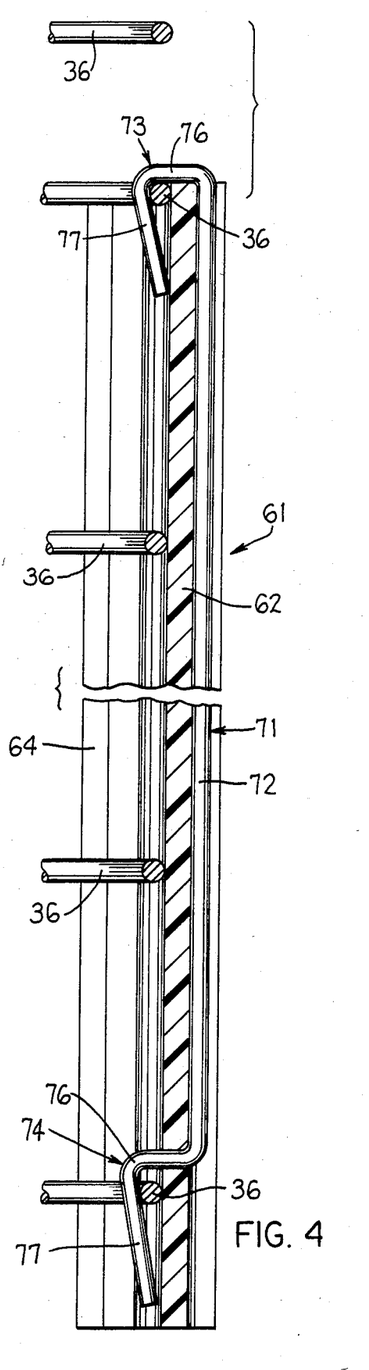
FIG. 4 is a sectional view taken substantially along line IV—IV in FIG. 2 and illustrates the bumper arrangement as secured to the basket.
Figure 5:
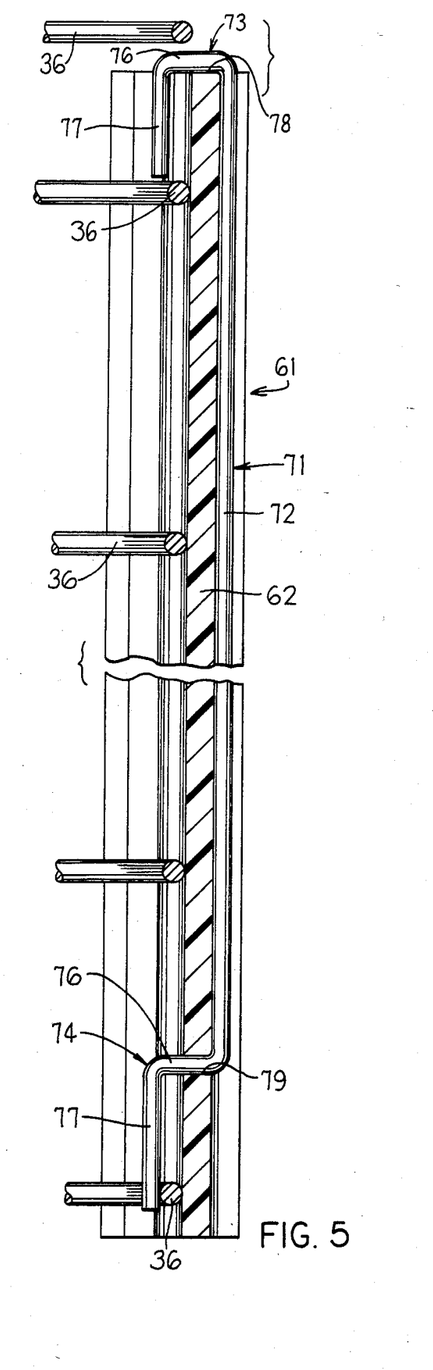
FIG. 5 is a sectional view similar to FIG. 4 but illustrates the bumper arrangement positioned adjacent the basket but prior to securement thereto.

As illustrated by FIGS. 4 and 5, the upper hook portion 73 is disposed so that the bridging portion 76 thereof is positioned closely adjacent but extends transversely across and above the upper end 78 of the bumper 62.

To initially assemble the bumper arrangement 61, the securing rod 71 is positioned in substantially perpendicular relationship with the bumper 62 so that the free end of the locking portion 77 associated with the lower hook 74 is disposed adjacent the outer surface of the bumper and substantially aligned with the hole 79 associated with the centermost groove 67. The securing rod 71 is then moved inwardly to cause the locking portion 77 to be inserted through the hole 79 and, upon reaching the rounded bend 81, the securing rod 71 is thence pivoted upwardly so as to be substantially parallel with the bumper 62. This results in the outer end of the bridging portion 76 being disposed within the opening 79, but the main rod part 72 is still spaced from the groove 67. Due to the limited flexibility of the securing rod 71, the securing rod is disposed so that the upper hook 73 is positioned adjacent one side of the upper end of the bumper 62. This enables the upper hook 73 to effectively straddle the bumper 62, whereupon the securing rod 71 can then be displaced sidewardly relative to the bumper 62 so that the upper hook 73 straddles the bumper and effectively extends over the upper end 78 thereof substantially along the central plane of the bumper. Thus assembled, the bumper arrangement 61 is ready to be mounted on the cart basket.

To mount the assembled bumper arrangement 61 on the front vertically extending corner of the cart basket 12, the bumper arrangement 61 is initially positioned adjacent the cart basket 12 so that the upper end of the bumper 62 is disposed fairly close to the upper edge of the basket. The upper end of the bumper arrangement is then tilted outwardly away from the basket through a small angular extent, whereupon the locking portion 77 associated with the lower hook 74 is then moved inwardly between a pair of vertical basket wires 34 to penetrate slightly into the interior of the basket, with the locking portion 77 being positioned directly above one of the lower horizontal rods 36. The bumper arrangement is then lowered a small extent to cause the lower horizontal rod 36 to enter into the slot defined by the lower hook 74. The upper end of the bumper arrangement is then pivoted inwardly back toward the basket, which pivoting preferably results in the locking portion 77 of the lower hook 74 being positioned inwardly of and in slightly vertically overlapping relationship with one of the lower horizontal rods 36. This inward pivoting of the upper portion of the bumper arrangement continues until the inner surface of the bumper 62 effectively abuts solidly against the basket, which abutment occurs due to the inner surfaces 64 (or the rounded inner surfaces of the grooved parts) of the bumper 62 engaging two or more of the vertically spaced horizontal rods 36. When the bumper is swung inwardly into this latter position, the upper hook 73 passes over one of the upper horizontal rods 36 so that the upper hook is substantially aligned above the adjacent rod 36 as illustrated in FIG. 5. Thereafter, the complete bumper arrangement 61 (including both the bumper 62 and securing rod 71) are then slidably pushed downwardly relative to the basket so that the upper rod 36 is relatively moved into the slot defined by the upper hook 73. This downward movement of the bumper arrangement 61 preferably occurs until one of the rods 36 effectively abuts its respective bridging portion 76 to prevent further downward movement. With the bumper arrangement so positioned, the inner locking portions 77 each project downwardly a substantial extent below the inner side of the respective horizontal rod 36. The free end of at least one of the locking rods 77, and preferably the free ends of both locking rods 77, are then suitably deformed by a tool such as pliers or the like so as to have the free end positioned beneath the respective rod 36, thereby forming a partially closed hook substantially as illustrated by FIG. 4, to prevent manual removal or accidental dislodgement of the bumper arrangement without first again deforming the locking portions 77 back to their original shape.

In most instances, the bumper 62 will sufficiently snugly fit against the corner of the cart basket to enable the bumper to be secured to the basket by means of a single locking rod 71, which rod is then positioned within the centermost groove 67. However, if desired or necessary, the bumper can be secured to the basket by use of two identical securing rods 71, in which case one of the rods would be positioned within each of the sidewardly spaced grooves (the middle groove not being used), so that one securing rod would attach to the front wall and the other to the side wall of the basket. The mounting of the bumper arrangement on the cart, when utilizing two securing rods rather than one, is substantially identical to that described above.

Figures 6, 8:
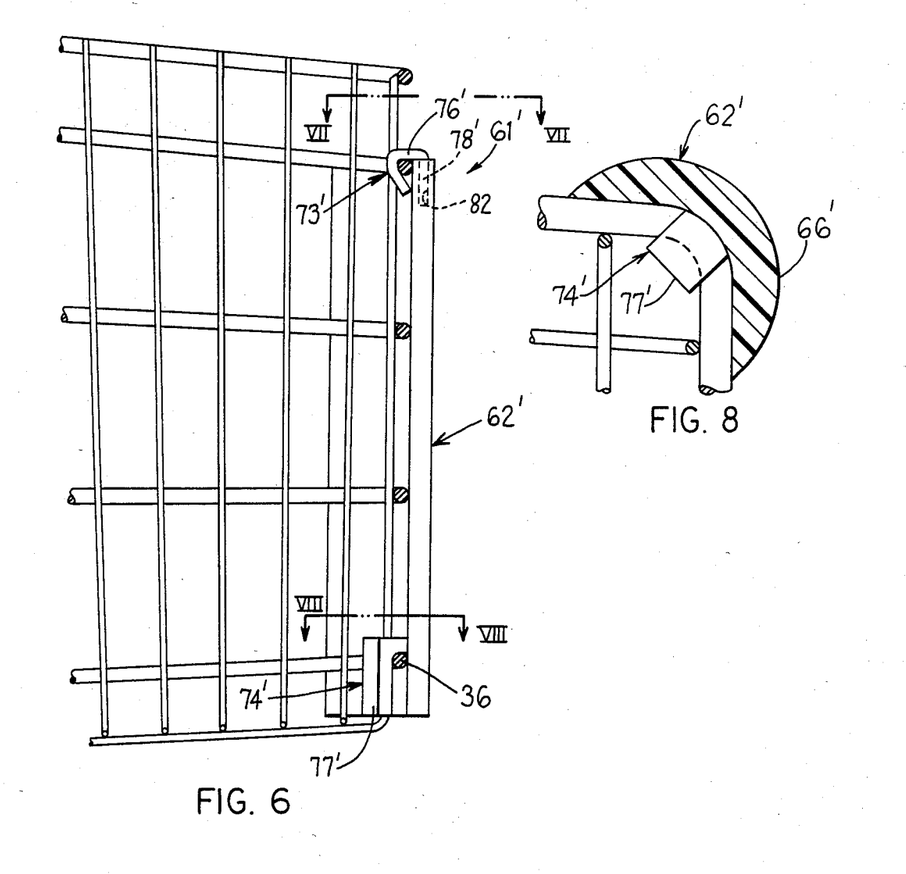
FIG. 6 is a sectional view similar to FIG. 4 but illustrating a second and preferred embodiment for the bumper strip of the present invention.
FIG. 8 is an enlarged fragmentary sectional view taken substantially along line VIII—VIII in FIG. 6.
Figure 7:
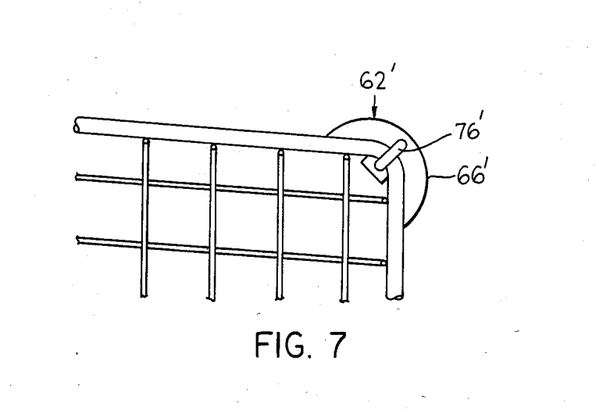
FIG. 7 is a fragmentary top view taken substantially along line VII—VII in FIG. 6.

Referring now to FIGS. 6–8, there is illustrated a second and preferred embodiment of the bumper arrangement 61' according to the present invention. The bumper arrangement of this embodiment is structurally and functionally similar to the bumper described in relationship to FIGS. 2–5 above, and thus corresponding parts have been designated by the same reference numerals but with a prime (') added thereto.

The bumper 62' is preferably formed by being molded and is not provided with exterior grooves extending longitudinally along the outer surface 66', but rather this outer surface 66' is a smooth and rounded surface. The bumper 62' is again secured to the basket by upper and lower hooks 73' and 74', respectively. The lower hook 74' is of an inwardly and downwardly projecting L-shaped configuration but, in this embodiment, this lower hook 74' is fixedly secured, as by being integrally molded, to the bumper strip 62'. This lower hook 74' results in the defining of a slot between the vertical leg 77' and the inner surface of the bumper strip so that the lower hook can be snugly slidably inserted downwardly over one of the lower horizontal basket wires 36.

The upper hook 73' is again formed from a selected length of metal rod and includes a bridging portion 76' which extends inwardly from the top of the bumper strip and terminates in a downwardly directed rodlike locking portion 77' which fits downwardly past one of the upper horizontal basket wires 36, with this rodlike portion 77' being deformed to lockingly secure the upper hook to the basket wire. The bridging portion 76', at its forward end, is secured to a vertical rod part 72' which projects vertically downwardly for seating engagement with the bumper strip 62'. This rod part 72' projects downwardly and engages the rod over only a selected vertical extent, such as approximately one inch, and for this purpose the bumper strip 62' has a small cylindrical opening 82 formed therein and opening downwardly from the upper end thereof, which opening snugly accommodates therein the rod part 72'.

To mount the bumper arrangement 61' on the front vertical corner of the cart basket, the bumper arrangement is positioned so that the bumper strip 62' is disposed close to the corner with the hooks 73' and 74' substantially aligned with vertical spacings between the horizontal basket wires 36. The bumper strip is moved inwardly until the hooks pass between the horizontal wires 36 so that the inner surface 66' is effectively seated against the horizontal wires 36. The bumper strip 62 is then slid downwardly so that the upper and lower hooks pass over the horizontal basket wires 36. After the bumper strip has been slid downwardly to ensure proper seating of the hooks on the wires 36, then the rear leg 77' of the upper hook 73' is deformed under its wire 36 to securely and positively lock the bumper strip to the basket.

The improved bumper arrangement of the present invention, as described above, has also proven highly desirable in maintaining alignment between the baskets of nested carts, and hence preventing a lock-up between nested baskets.

More specifically, particularly in carts employing larger baskets, the length of the basket is generally increased significantly with respect to the basket height, and particularly with respect to the height of the swingable rear gate. Hence, when the basket on a rear cart is nested within the basket of a front cart, the rear gate on the front cart swings upwardly into its nesting position. With most conventional carts, the raised rear gate of the front cart rests on the upper edge of the front wall associated with the rear basket. With the cart baskets becoming longer, however, the baskets internest through a greater distance, and it has been observed that nesting of these longer baskets now results in the front wall of the rear basket being disposed forwardly from the lower free edge of the rear gate associated with the front basket when this latter gate is in its raised nested position. To maintain the gate in this raised nesting position, the gate has to bear on the upper edges of the opposed side walls of the rear basket. While this support is maintained so long as the nested baskets are properly aligned, nevertheless the clearances permit the baskets to assume a substantial degree of misalignment when nested together, and when this misalignment occurs, one side of the raised rear gate of the front basket will no longer be supported on the side wall of the rear basket, whereupon one corner of the raised rear gate on the front basket will deflect downwardly into the interior of the rear basket. Hence, when a customer attempts to separate the nested carts by pulling the front cart forwardly, the rear gate on the frontmost cart interferes with the basket of the rear cart, and thus prevents unnesting of the carts.

This latter-described problem has been minimized, if not eliminated, with the improved bumper arrangement of this invention. This bumper arrangement projects sidewardly a substantial extent beyond each of the basket side walls. Hence, when a rear basket is moved nestingly into a front basket, the bumpers on the rear basket slidably engage the side walls of the front basket and maintain the two baskets in a more properly aligned relationship when nested. In this manner, the raised rear gate of the front basket will always remain supported on the upper edges of the side walls of the rear basket, and hence the raised gate of the front basket is prevented from drooping downwardly into the rear basket to prevent denesting when the front cart is pulled forwardly.

To facilitate efficient and economical manufacture of the bumper 62, same is preferably extruded of a plastics material in the form of an elongated strip, which strip can then be cut to the desired lengths. This extrusion is facilitated by utilizing a cross-sectional configuration for the bumper corresponding to that illustrated by FIG. 3. With this configuration, the central portions of the bumper where the grooves 67 are located are hence deformed inwardly so that the resulting bumper has a substantially uniform thickness throughout the cross section thereof, except at the extreme side edges as defined by the surfaces 64. These rounded groove portions themselves have smoothly rounded inner surfaces which can also effectively contact the horizontal wires 36 when the bumper is mounted on the basket.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a shopping cart having a wheeled base and an upwardly opening basket mounted on said base in upwardly spaced relationship therefrom, said basket including a front wall which extends between and rigidly joins to a pair of side walls, said front wall where it joins to said side walls defining a pair of front corners, said front and side walls being of a meshlike construction formed from a plurality of transversely extending rods which intersect and are joined together, said plurality of rods including a plurality of substantially horizontally extending rods which are vertically spaced apart, and a bumper arrangement attached to said basket in the vicinity of each said corner, the improvement wherein said bumper arrangement comprises:

a vertically elongated striplike bumper formed of a synthetic resin material, said bumper being positioned closely adjacent the exterior side of said corner and extending through a vertical extent which is a majority of the vertical extent of said corner;

said bumper having a substantially L-shaped cross section and an inner surface which is adapted to abuttingly engage the horizontal rods defining said basket in the vicinity of said corner, said inner surface having a configuration which closely corresponds to the configuration of said corner so that said bumper can closely conform to said corner;

lower hook means stationarily secured to said bumper adjacent the lower end thereof and projecting inwardly and downwardly therefrom for engagement with a said horizontal wire;

upper hook means associated with the upper end of said bumper for engagement with a second said horizontal wire which is vertically spaced upwardly from said first horizontal wire.

2. A cart according to claim 1, wherein said upper hook means is formed from a wire rod member which includes a top bridging portion which projects rearwardly from the bumper strip and terminates in a downwardly projecting rear leg which overlaps said second horizontal wire, said rear leg being deformable into a position beneath said second horizontal wire to lock said upper hook thereto, said rod member including a front vertical leg which projects downwardly from said bridging part for holding engagement with said striplike bumper.

3. A cart according to claim 2, wherein said lower hook means is constructed of a synthetic resin material which is integrally joined to said striplike bumper.

4. A cart according to claim 2, wherein said lower hook means is constructed as a wire rod part which is stationarily seated on and projects rearwardly and downwardly from said bumper adjacent the lower end thereof.

5. A cart according to claim 4, wherein the front leg of said upper hook means projects vertically downwardly of said bumper and is integrally joined to said lower hook part.

6. A cart according to claim 2, wherein said bumper has a convexly rounded outer surface which effectively terminates adjacent the side edges of said inner surface.

7. In a shopping cart having a wheeled base and an upwardly opening basket mounted on said base in upwardly spaced relationship therefrom, said basket including a front wall which extends between and rigidly joins to a pair of side walls, said front wall where it joins to said side walls defining a pair of front corners, said front and side walls being of a meshlike construction formed from a plurality of transversely extending rods which intersect and are joined together, said plurality of rods including a plurality of substantially horizontally extending rods which are vertically spaced apart, and a bumper arrangement attached to said basket in the vicinity of each said corner, the improvement wherein said bumper arrangement comprises:

a vertically elongated striplike bumper formed of a synthetic resin material, said bumper being positioned closely adjacent the exterior side of said corner and extending through a vertical extent which is a majority of the vertical extent of said corner;

said bumper having a substantially L-shaped cross section and an inner surface which is adapted to abuttingly engage the horizontal rods defining said basket in the vicinity of said corner, said inner surface having a configuration which closely corresponds to the configuration of said corner so that said bumper can closely conform to said corner;

said bumper having elongated groove means formed therein and extending lengthwise thereof, said elongated groove means being positioned outwardly from said inner surface; and a securing rod means cooperating with said bumper for fixedly attaching the latter to the corner of said basket, said securing rod means including a vertically elongated and substantially straight main rod portion which is positioned within and extends longitudinally of said groove means;

said rod means having upper and lower hook means fixed to said main rod portion and projecting inwardly and downwardly therefrom for engagement with a pair of said horizontal wires as disposed in vertically spaced relationship.

8. A cart according to claim 1, wherein said bumper has a convexly rounded outer surface which effectively terminates adjacent the side edges of said inner surface, said groove means being formed in said bumper in the vicinity of and opening outwardly through said outer surface, the main rod portion of said rod means being securely positioned within said groove means.

9. A cart according to claim 1, wherein said upper hook means is of a substantially L-shaped configuration and includes a bridging portion which is secured to said main rod portion adjacent the upper end thereof and extends transversely therefrom across said bumper to a location disposed inwardly from said inner surface, said upper hook including a downwardly projecting rodlike locking portion which is fixed to the other end of said bridging portion and projects downwardly therefrom in substantially parallel relationship with said main rod portion to define a downwardly opening slot for accommodating therein one of said horizontal rods, and wherein said lower hook means is also defined by a substantially L-shaped lower hook having a bridging portion which is fixed to said main rod portion adjacent the lower end thereof and extends transversely therefrom substantially across the width of said bumper to a location spaced inwardly from said inner surface, said lower hook also having a downwardly projecting rodlike locking portion which is secured to the other end of said last-mentioned bridging portion for permitting another of said horizontal rods to be positioned between said locking portion and said inner surface.

10. A cart according to claim 3, wherein said bumper has an opening extending transversely therethrough from the bottom of said groove means in the vicinity of the lower end of said bumper, said lower hook having its bridging portion extending through said opening.

11. A cart according to claim 4, wherein said upper hook has the bridging portion thereof positioned above the upper end of said bumper.

12. A cart according to claim 5, wherein said bumper has a convexly rounded outer surface which terminates at the side edges of said inner surface, said groove means being formed in said bumper in the vicinity of and opening outwardly through said outer surface, the main rod portion of said rod means being securely positioned within said groove means.

13. A cart according to claim 6, wherein said main rod portion and said upper and lower hooks are integrally formed in one piece by being bent from an elongated wire rod.

14. A cart according to claim 4, wherein said rodlike locking portions have the free ends thereof projecting downwardly below the respective horizontal rod, at least one of said locking portions adjacent the free end thereof being deformed into a position below said respective horizontal rod for creating at least a partially closed hook to positively secure said bumper arrangement to said cart.

15. A cart according to claim 2, wherein said groove means includes at least three grooves formed in and extending longitudinally of said bumper in substantially parallel relationship, said grooves all opening outwardly through the exterior surface thereof, at least one of said grooves being positioned substantially along the central longitudinal plane of the bumper, the other two grooves being disposed substantially uniformly spaced on opposite sides of said first-mentioned groove.

* * * * *

UNITED STATES PATENT AND TRADEMARK OFFICE
CERTIFICATE OF CORRECTION

PATENT NO. : 4 600 204
DATED : July 15, 1986
INVENTOR(S) : Ronald L. BADGER

It is certified that error appears in the above-identified patent and that said Letters Patent is hereby corrected as shown below:

Column 11, line 41; change "claim 1" to ---claim 7---.

Column 11, line 48; change "claim 1" to ---claim 7---.

Column 12, line 17; change "claim 3" to ---claim 9---.

Column 12, line 22; change "claim 4" to ---claim 10---.

Column 12, line 25; change "claim 5" to ---claim 11---.

Column 12, line 32; change "claim 6" to ---claim 12---.

Column 12, line 36; change "claim 4" to ---claim 10---.

Column 12, line 44; change "claim 2" to ---claim 8---.

Signed and Sealed this

Sixteenth Day of December, 1986

Attest:

DONALD J. QUIGG

Attesting Officer

Commissioner of Patents and Trademarks